April 8, 1969 R. P. ROHDE 3,437,265
VANE-TYPE ROTARY MECHANISM
Original Filed June 9, 1966 Sheet 1 of 3

INVENTOR
Robert P. Rohde
BY
C. K. Veenstra
ATTORNEY

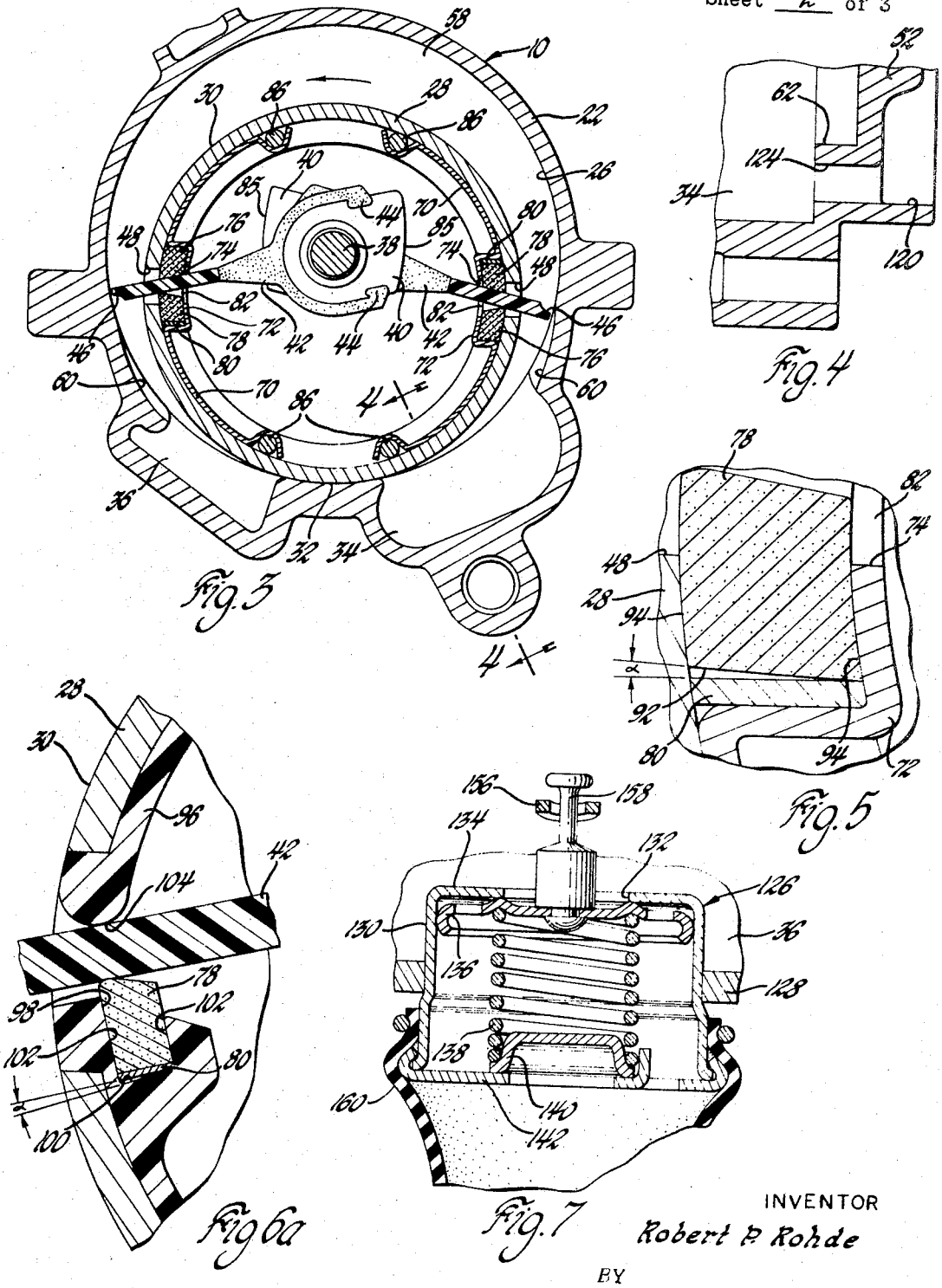

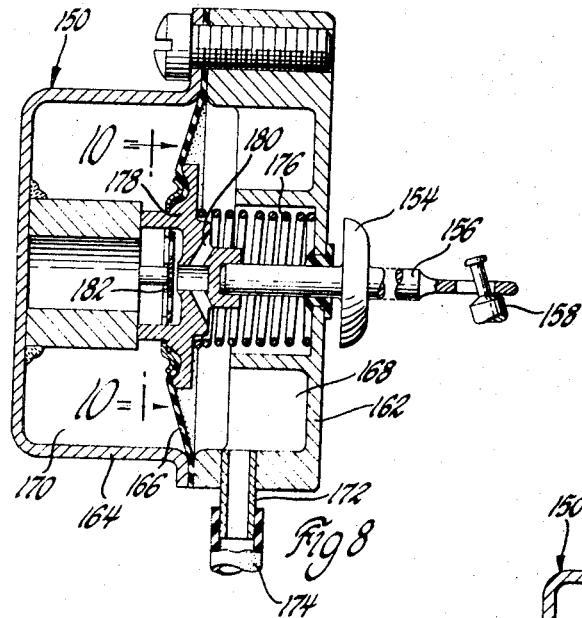
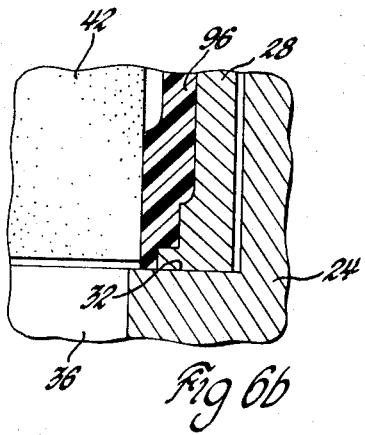
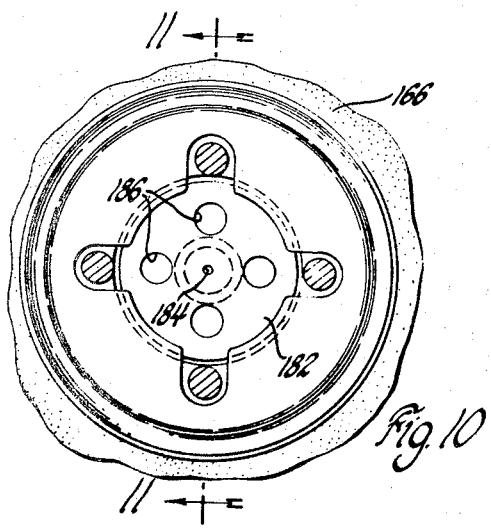
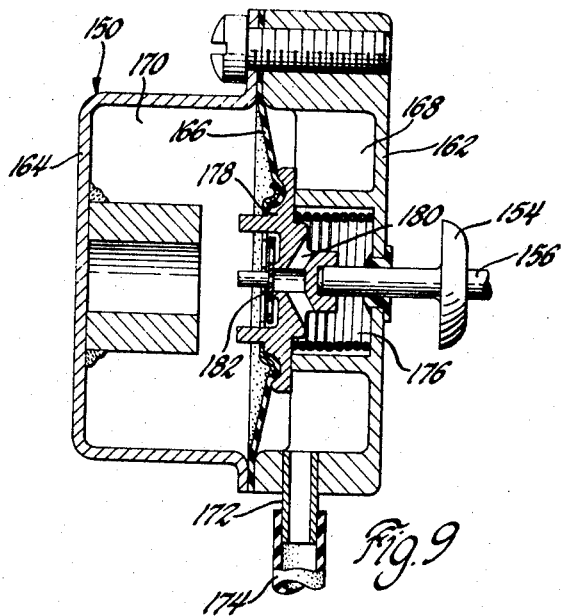
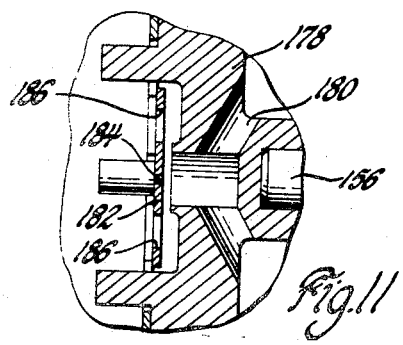
INVENTOR
Robert P. Rohde

United States Patent Office 3,437,265
Patented Apr. 8, 1969

3,437,265
VANE-TYPE ROTARY MECHANISM
Robert P. Rohde, Saginaw, Mich., assignor to General Motors Corporation, Detroit, Mich., a corporation of Delaware
Original application June 9, 1966, Ser. No. 556,367. Divided and this application June 3, 1968, Ser. No. 734,066
Int. Cl. F04c *17/00;* F04d *29/02*
U.S. Cl. 230—157                        4 Claims

ABSTRACT OF THE DISCLOSURE

A vane pump supplies air for injection into the exhaust gases of an internal combustion engine. In the pump, vane bearing shoes are supported in channels, the facing base portions of the shoes and the channels being formed to maintain a wedge-shaped clearance therebetween.

---

This is a division of Ser. No. 556,367, filed June 9, 1966.

In the recent past increasing emphasis has been placed on reducing the proportion of unburned constituents, such as unburned hydrocarbons and carbon monoxide, present in the exhaust gases emitted from automotive engines. One of the most effective arrangements devised to accomplish this reduction is the Air Injection Reactor system. In this system, an engine driven pump injects a stream of air into the flow of hot exhaust gases as they are emitted from the engine combustion chambers. Utilizing the heat of the exhaust gases, the injected air supports additional burning of the exhaust gases in the engine exhaust passages to reduce the proportion of unburned exhaust gas constituents.

The requirements imposed upon the pump used to supply the air in the Air Injection Reactor system are quite stringent; as one example, the pump must run efficiently over a wide range of engine and vehicle speeds without making periodic lubrication necessary. It has been discovered that a semi-articulated vane pump is a very efficient and economical type for such an application.

An object of this invention is to provide an improved mechanism which is especially useful as a pump to provide air under proper flow conditions in an Air Injection Reactor system. More particularly, in the improved air pump provided by this invention, wedge shaped openings are formed between the bases of the vane drive and follower bearing strips and their supporting members to reduce noise attributed to movement of the bearing strips in their supporting slots. Other improved features of the pump are outlined below and disclosed in Patent 3,370,785 and other pending applications.

An important feature of the improved pump disclosed herein is a combination of a rotor disposed within a stator to form a working chamber in which the exterior surface of the rotor is provided with an abradable surface coating to seal the working chamber at both ends and in the area between the inlet and outlet.

In additional feature, the mechanism shown herein includes a rotor formed by impact extrusion and adapted to guide a plurality of vanes through a working chamber in which the rotor contains an inserted liner supporting vane bearing shoes. Two embodiments of such a liner are disclosed—one being fabricated, and the other being molded in place.

As a further feature of the mechanism disclosed herein includes a vane molded about a counter-weighted hub.

As another feature, the mechanism disclosed herein includes a rotor accurately aligned within a stator and retained in aligned position by material injected about the outer race of a ball bearing unit, the inner race of which is secured to the rotor.

In addition, the mechanism disclosed herein has as a feature a rotary air cleaner secured to a pump rotor drive shaft.

Further, the mechanism disclosed herein includes as a feature small vane shoes forming bearing surfaces at each end of the vanes.

Moreover, the fluid flow control mechanism disclosed herein has as a feature a construction of the stator end wall which allows a pulley supporting hub to be assembled on the rotor drive shaft before the rotor is assembled within the stator.

Furthermore, the fluid flow control mechanism disclosed herein has as a feature a regulating valve means which prevents excessive air flow to the engine exhaust system. This regulating valve means includes a pressure relief valve to divert a portion of the air flow at high speeds and additionally includes an engine vacuum operated actuator to divert the air flow through the relief valve during vehicle deceleration.

The details as well as other objects and advantages of this invention aret disclosed in the following description of a preferred embodiment of this fluid flow control mechanism as shown in the drawings in which:

FIGURE 3 is a sectional view along line 3—3 of FIGURE 2 illustrating the vane and fabricated rotor liner constructions;

FIGURE 4 is an enlarged sectional view along line 4—4 of FIGURE 3 illustrating the air flow path from the air cleaner to the pump inlet chamber;

FIGURE 5 is an enlarged view of a portion of FIGURE 3 illustrating the wedge-shaped clearance between the vane follower bearing strip and its supporting construction;

FIGURE 6A is an enlarged view of a portion of the molded rotor liner illustrating the drive bearing surface provided for the vane and also illustrating an alternative construction for achieving the wedge-shaped clearance between the vane follower bearing strip and its support;

FIGURE 6B is an enlarged view of another portion of the molded rotor liner illustrating the bearing surface provided for the end of the vane;

FIGURE 7 is an enlarged sectional view along line 7—7 of FIGURE 2 illustrating the pressure relief valve;

FIGURE 8 is an enlarged sectional view of the engine vacuum operated relief valve actuator showing the actuator showing the actuator in normal position;

FIGURE 9 is a view similar to FIGURE 8 showing the actuator in valve operating position;

FIGURE 10 is a sectional view along line 10—10 of FIGURE 8 further enlarged to show details of a timing valve mechanism; and FIGURE 11 is a sectional view along line 11—11 of FIGURE 10 illustrating further details of the timing valve.

Figure 1:
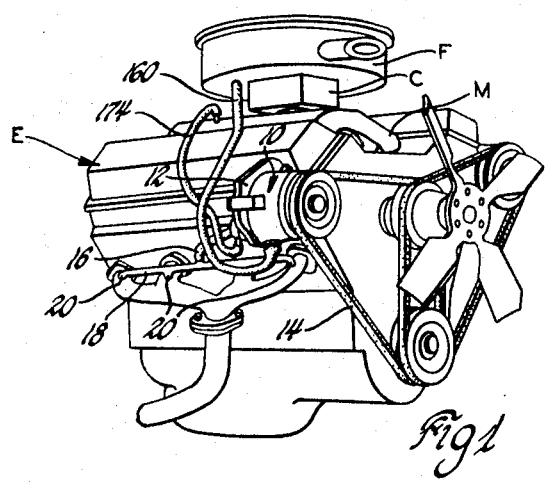
FIGURE 1 is a view of an automotive vehicle internal combustion engine provided with a pump which injects air into the exhaust system and with regulating valve means therefor.

Referring first to FIGURE 1, an internal combustion engine E is provided with a carburetor C which forms a combustible mixture for delivery to the combustion chambers through an intake manifold M. An air filter F provides clean air for carburetor C. An air pump 10 is secured to engine E by a bracket 12 and is driven from engine E by a belt 14. Air pump 10 has an outlet hose 16 through which air is delivered to an air manifold 18. Air manifold 18 has a series of injection tubes 20 through which air is injected into the stream of exhaust gases leaving the engine combustion chambers.

Figure 2:
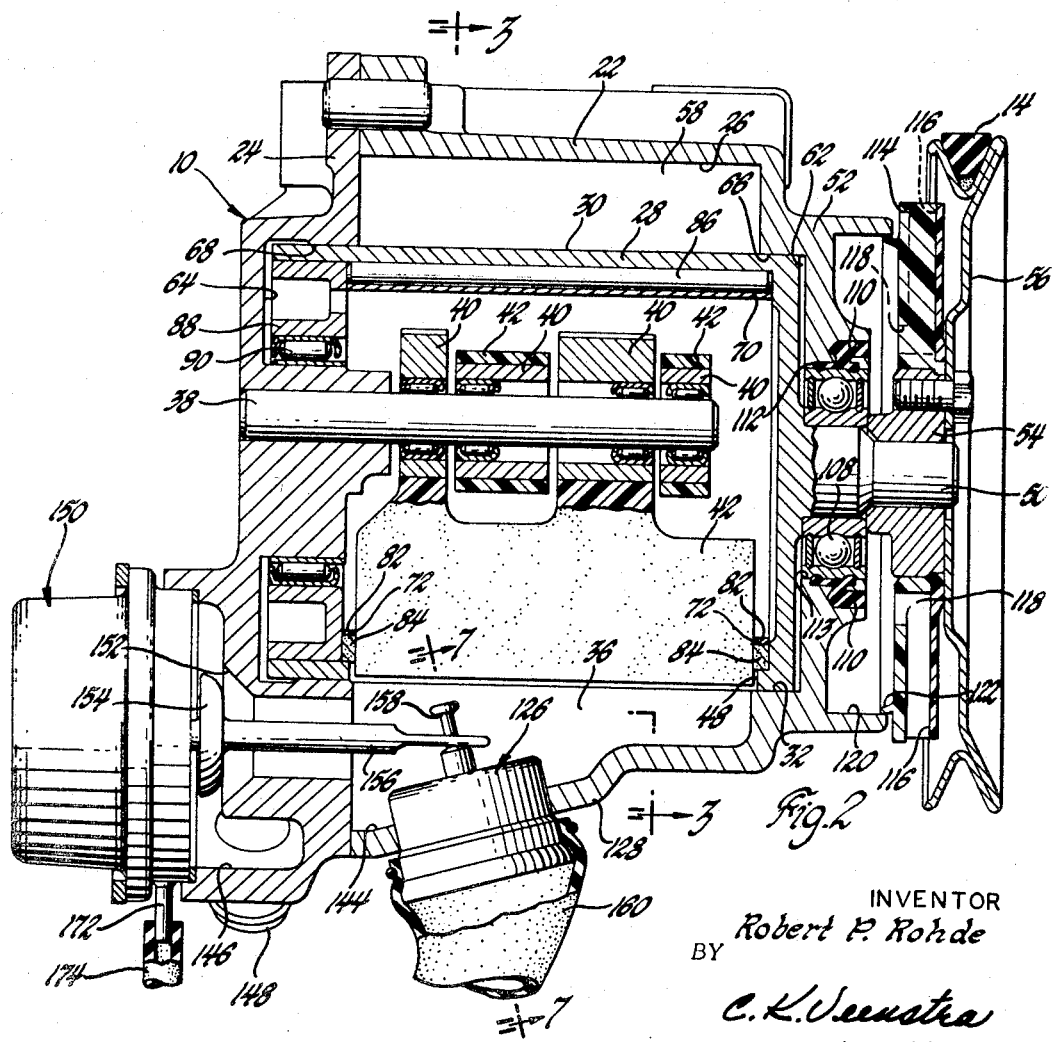
FIGURE 2 is an axial sectional view through the pump and its outlet chamber illustrating the rotor sealing locations, the rotor alignment construction, the air cleaner, the vane end bearing shoes, the stator end wall construction, and the regulating valve means.

Referring now to FIGURES 2 and 3, air pump 10 has a concave housing 22 closed by a cover plate 24. As shown in FIGURE 3, the interior wall 26 of housing 22 is of circular cross-section. A rotor 28 disposed in housing 22 on an axis eccentric to the axis of the housing, has an exterior wall 30 of circular cross-section which is tangent the interior wall 26 of housing 22 at its lowermost point to provide a stripping land 32.

Housing 22 is an aluminum casting and rotor 28 is a steel impact extrusion so that, as the temperature of the pump increases during operation, housing 22 will expand faster than rotor 28 to prevent interference between these two parts.

The interior wall 26 is recessed on opposite sides of the stripping land 32 to form an inlet chamber 34 and an outlet chamber 36. A particular advantage is achieved by locating the inlet and outlet chambers 34 and 36 at the bottom of the pump since any moisture tending to condense in the pump will drain into these areas. Should the pump be mounted in an inverted position, the moisture would drain to another portion of the housing and, were it to freeze, would interfere with pump operation.

A shaft 38 is secured in cover plate 24 and extends into housing 22 concentrically with the interior wall 26. Two pairs of bearing supported, counter-weight hubs 40 are positioned on shaft 38. Around each pair of hubs is molded a vane 42 which locks into the hubs 40 as shown at 44 in FIGURE 3.

Each vane 42 extends out to the interior wall 26 of the housing 22. As shown in FIGURE 3, the tips of vane 42 are provided with a curved recess 46. The vanes are molded from a thermo-setting plastic resin reinforced with random glass or asbestos fibers and are constructed to contact interior wall 26. During initial running of the pump the tips of the vane 42 abrade on the interior wall 26, thus forming a slight clearance between vanes 42 and wall 26. This slight clearance reduces the frictional resistance of the pump but does not seriously reduce its pumping efficiency.

Rotor 28 surrounds shaft 38 and hubs 40 and is provided with slots 48 through which vanes 42 extend. Rotor 28 has an integral shaft 50 extending through an end wall 52 of housing 22. A hub 54 is pressed onto shaft 50, and a pulley 56 is bolted to hub 54. Pulley 56 may be interchanged with other pulleys of different diameters to provide various rotor speeds for the same engine. As rotor 28 is driven by engine E through belt 14, pulley 56, hub 54, and shaft 50, vanes 42 are swept through the crescent-shaped working chamber 58 (counter-clockwise as viewed in FIGURE 3) to draw air from inlet chamber 34 and direct a pressurized stream of air into outlet 36. Stripping land 32 prevents leakage of air between outlet chamber 36 and inlet chamber 34.

As shown in FIGURE 3, the interior wall 26 of housing 22 is provided with notches 60 between the working chamber 58 and the inlet and outlet chambers 34 and 36. Notches 60 prevent a sudden change in pressure as vanes 42 pass the inlet and outlet chambers 34 and 36 and contribute to smooth and quiet operation of the pump.

As shown in FIGURE 2, end wall 52 of housing 22 and cover plate 24 are provided with interior recesses 62 and 64 into which the ends of rotor 28 extend. Shoulders 66 and 68 in the recesses 62 and 64 seal on the exterior wall 30 of the rotor 28 to close the ends of the working chamber 58. An abradable surface coating, such as a coating containing molybdenum disulfide, is applied to the entire surface of exterior wall 30 to enhance the sealing and provide a bearing surface at the ends of the working chamber on shoulders 66 and 68 and between the inlet and outlet chambers 34 and 36 at the stripping land 32.

As shown in FIGURES 2, 3, and 4 with specific reference to FIGURE 3, metal liners 70 are spot welded within rotor 28. Liners 70 are formed into outwardly extending recesses at 72 and are provided with slots 74 through which the vanes 42 extend. The recessed liners 70 provide channels adjacent the slots 48 in the rotor which support carbon drive and follower bearing shoe strips 76 and 78. Leaf-type springs 80 bias follower shoes 78 against the vanes 42. Strips 76 and 78 provide a bearing surface for the vanes 42 and close slots 48 to seal working chamber 58 from the interior of rotor 28.

Slots 74 do not extend the entire axial length of the recessed liners 70 and rotor 28 but rather terminate short of the ends to provide straps 82 adjacent each end of vanes 42. Straps 82 retain small arcuate carbon shoe strips 84 (shown in section in FIGURE 2) at each end of vanes 42 to provide bearing surfaces at each end of vanes 42.

Referring to FIGURE 3, it will be noted that counterweight hubs 40 are asymmetrically curved at 85. This curvature allows the vane and hub assemblies to be inserted within the rotor 28 and the tips 46 of the vanes 42 inserted through slots 74 in the recessed liners 70, subsequent to which shaft 38 is inserted through the bearings in hubs 40.

Dowels 86 are held in place by liner 70 and as shown in FIGURE 2 are bottomed against the closed end of rotor 28. Dowels 86 provide a reference point to which a cap 88 may be pressed to enclose the open end of rotor 28. Cap 88 forms a bearing mounting surface for a roller bearing 90.

As illustrated in FIGURE 5, a wedge-shaped clearance is provided beneath the vane drive and follower bearing shoes 76 and 78 to prevent a squeaking noise attributed to movement of the shoes in the channel. This wedge-shaped clearance may be provided by inclining the base 92 of the shoes at a slight angle $\alpha$ relative to the sides 94 of the shoes, or alternatively, by inclining the follower springs 80 or the base of the channel.

FIGURES 6A and 6B illustrate an embodiment in which the rotor liner is molded in place rather than fabricated. Molded liner 96 covers the entire inner surface of the rotor 28 and is formed with vane follower bearing shoe and spring supporting channels 98. As indicated in FIGURE 6A, the base 100 of channels 98 may be inclined at an angle $\alpha$ relative to the sides 102 to create a wedge-shaped clearance space beneath the shoes. Thermo-setting plastic resins, particularly phenolics, reinforced with strands of fiberglass or asbestos have been found particularly satisfactory as liner materials. With such materials the liner may provide a direct bearing surface for vanes 42, eliminating the necessity for vane drive shoes 76 and at least one set of vane end shoes 84. When these shoes are eliminated, liner 96 bears directly against vanes 42 at the contoured portion 104 indicated in FIGURE 6A and directly against the end of vanes 42 as indicated in FIGURE 6B.

Referring now to FIGURE 2, a set of ball bearings 108 are pressed on shaft 50 prior to assembly of rotor 28 within housing 22 and the rotor is then accurately aligned within housing 22 between the ends of the recesses 62 and 64. A plastic material is then injected through openings 110 into an annular space 112 about the bearing 108. Upon heardening, the plastic in the annular space 112 maintains rotor 28 against axial movement within housing 22.

Still referring to FIGURE 2, it will be noted that end wall 52 of housing 22 has an opening 113 sufficiently large that hub 54 may pass therethrough. This allows hub 54 to be pressed on shaft 50 prior to assembly of rotor 28 within housing 22 and prevents damage which might otherwise occur were hub 54 to be pressed on shaft 50 after assembly.

An air cleaner 114 is secured about hub 54. Air cleaner 114 includes a plurality of radially directed passages 116 which connect with axially directed apertures 118. Apertures 118 open into an annular recess 120 on the outside of end wall 52 of housing 22. A lip 122 on air cleaner 114 seals the open end of recess 120. As shown in FIGURE 4, a passage 124 connects annular recess 120 with the inlet chamber 34. During operation of the pump, air flows radially through openings 116 and apertures 118 into recess 120 and from there through passage 124 into inlet chamber 34. The construction of cleaner 114 is such that it centrifuges out dust particles and other foreign material and permits only clean air to be drawn into the pump.

Referring now to FIGURES 2 and 7, a pressure relief valve 126 is pressed into an opening in the side wall 128 of exhaust chamber 36. Pressure relief valve 126 includes a cup-shaped member 130 having an opening 132 from chamber 36. The base 134 of member 130 forms a valve seat for a plate-type valve member 136. Valve member 136 is biased against the base 134 by a spring 138 seated in spring seat members 140 and 142. It will be appreciated that the force of spring 138 may be controlled by adjusting the configuration of seat member 143 so that the axial distance between seat member 142 and base 134 is varied. Valve member 136 is lifted off base 134 against the bias of spring 138 by pressures in outlet chamber 36 above a predetermined minimum. Thus the pressure relief valve 126 diverts air from outlet chamber 36 during high engine speeds (which cause high pump speeds and consequent high pressure) when the rate of air delivered by the pump is not required or desirable in the exhaust system.

Referring to FIGURE 2, it will be noted that outlet chamber 36 is formed by a first chamber portion 114 and a second chamber portion 146. A fitting 148 extends from outlet chamber portion 146 and has hose 16 connected thereto which, as shown in FIGURE 1, directs air into the air manifold 18.

During deceleration of the vehicle, the exhaust contains a high proportion of unburned constituents. When air is added during a sudden deceleration of the vehicle, a mixture is formed which is susceptible to explosion or backfire. In order to avoid such, an actuator 150 is adapted to prevent the flow of air from outlet chamber portion 144 to outlet chamber portion 146 and at the same time to divert the air flow delivered by the pump through the relief valve 126. Actuator 150 and relief valve 126 form a regulating valve means which prevents injection of air into the exhaust gas during deceleration.

As shown in FIGURE 2, a valve seat 152 is formed between outlet chamber portions 144 and 146. A valve member 154 formed on the actuator plunger 156 cooperates with valve seat 152 to prevent air flow from outlet chamber portion 144 to outlet chamber potrion 146. Simultaneously, plunger 156 actuates a stem 158 secured to relief valve member 136 to open the relief valve.

When air is discharged from relief valve 126 at low vehicle speeds, it is desirable that the noise of air flow therethrough be silenced. This is accomplished by connecting a hose 160 to relief valve 126 so that all air flow from valve 126 is directed to the combustion air filter F as indicated in FIGURE 1. Alternatively, separate silencing means may be included as a component of the relief valve 126.

FIGURES 8 through 11 illustrate an embodiment of the actuator 150. Actuator 150 includes first and second housing members 162 and 164 clamped about a flexible pressure responsive diaphragm 166 to form a pair of chambers 168 and 170. Chamber 168 has a fitting 172 by which connection is made through a hose 174 to a source of engine vacuum such as the intake manifold M, as shown in FIGURE 1. During engine deceleration, engine vacuum is sufficient to overcome the force of a spring 176 and pull diaphragm 166 to the right as viewed in FIGURES 8 and 9. A member 178, secured to diaphragm 166, carries plunger 156 which operates valve 154 and, through stem 158, valve 126. Thus, during engine deceleration, air is not injected into the exhaust system but rather is diverted into the engine air filter F.

Since it is desirable that diversion of the pump air delivery occur for only a predetermined interval, actuator 150 is provided with means for timing the subsequent opening of valve 154 and closing of valve 126. Member 178 has an opening 180 extending from chamber 168 to chamber 170. A small plate-like valve member 182, shown best in FIGURE 11, controls air flow through opening 180 to and from chamber 170. When high engine vacuum is applied to chamber 168, valve member 182 senses the pressure differential between chambers 168 and 170 at opening 180 and closes the opening. A restricted bleed 184 through valve 182 allows emptying of chamber 170 within a predetermined interval. When the pressure in chamber 170 approaches that within chamber 168, spring 176 moves the diaphragm 166 and plunger 156 to the left as viewed in FIGURES 8 and 9, opening valve 154 and closing valve 126 to permit delivery of air to the exhaust gases. If, before chamber 170 is emptied, the carburetor throttle is again opened, the pressure in chamber 168 rises and valve 182 moves away from opening 180. A plurality of large openings 186 allow the pressure in chamber 170 to be raised instantly to the pressure in 168 so that diaphragm 166 and plunger 156 move to the left, quickly opening the valve 154 and closing valve 126.

It will be appreciated that many features of the fluid flow control mechanism shown and described herein are useful in environments quite different from the Air Injection Reactor system. It should also be appreciated, however, that in the Air Injection Reactor system, this fluid flow control mechanism dependably and efficiently provides air flow at proper pressures and rates to effectively control exhaust emissions over a wide range of engine and vehicle speeds.

I claim:

1. A rotary mechanism comprising a housing having a cylindrical internal peripheral wall forming a cavity, a rotor eccentrically positioned within said cavity and having a cylindrical external peripheral wall radially spaced from at least a portion of said internal peripheral wall to form a working chamber, a shaft extending concentrically into said cavity, said shaft being surrounded by said rotor, at least one radially extending vane mounted for rotation upon said shaft, said rotor having a slot through which said vane extends into said working chamber, said rotor and vane being adapted upon rotation to direct a fluid stream through said working chamber, said rotor having an axially extending channel opening into said slot, and a vane bearing shoe positioned in said channel to provide a bearing surface for said vane, said shoe and said channel having facing base portions formed to provide an axially extending line of contact therebetween and formed to maintain therebetween a wedge-shaped clearance opening radially from said line of contact.

2. The rotary mechanism of claim 1 wherein the base of said shoe is inclined to the sides thereof to provide said clearance.

3. The rotary mechanism of claim 1 wherein the base of said channel is inclined to the sides thereof to provide said clearance.

4. The rotary mechanism of claim 1 wherein said shoe contacts said vane along an axially extending line adjacent the radially outermost surface of said shoe, wherein said line of contact between the facing portions of said shoe and said channel extends adjacent the radially innermost surface of said shoe, and wherein said wedge-shaped clearance opens radially outwardly.

References Cited

UNITED STATES PATENTS

| | | | |
|---|---|---|---|
| 1,720,577 | 7/1929 | Stern | 103—144 |
| 1,879,405 | 9/1932 | Moore | 103—144 |
| 2,470,656 | 5/1949 | Shorrock | 230—157 |
| 3,072,068 | 1/1963 | Weiss | 103—144 |
| 3,346,176 | 10/1967 | Ezop | 230—157 |
| 3,356,292 | 12/1967 | Brewer et al. | 230—157 |
| 3,370,785 | 2/1968 | Pasek et al. | 230—157 |
| 3,373,929 | 3/1968 | Partain | 230—157 |

ROBERT M. WALKER, *Primary Examiner.*

WILBUR J. GOODLIN, *Assistant Examiner.*